US010509950B2

(12) United States Patent
Norimatsu

(10) Patent No.: US 10,509,950 B2
(45) Date of Patent: Dec. 17, 2019

(54) GUIDANCE ACQUISITION DEVICE, GUIDANCE ACQUISITION METHOD, AND PROGRAM

(71) Applicant: NEC CORPORATION, Tokyo (JP)

(72) Inventor: Koui Norimatsu, Tokyo (JP)

(73) Assignee: NEC CORPORATION, Minato-ku, Tokyo (JP)

( * ) Notice: Subject to any disclaimer, the term of this patent is extended or adjusted under 35 U.S.C. 154(b) by 0 days.

(21) Appl. No.: 16/279,220

(22) Filed: Feb. 19, 2019

(65) Prior Publication Data

US 2019/0180088 A1 Jun. 13, 2019

Related U.S. Application Data

(63) Continuation of application No. 15/758,136, filed as application No. PCT/JP2016/074639 on Aug. 24, 2016.

(30) Foreign Application Priority Data

Sep. 9, 2015 (JP) .................. 2015-177813

(51) Int. Cl.
*G06K 9/00* (2006.01)
*G07C 9/00* (2006.01)
(Continued)

(52) U.S. Cl.
CPC ..... *G06K 9/00288* (2013.01); *G06K 9/00248* (2013.01); *G06K 9/00671* (2013.01);
(Continued)

(58) Field of Classification Search
None
See application file for complete search history.

(56) References Cited

U.S. PATENT DOCUMENTS

2010/0053363 A1* 3/2010 Kim ................ G06K 9/00255
348/222.1
2014/0270404 A1* 9/2014 Hanna ............... G06Q 30/0609
382/116
(Continued)

FOREIGN PATENT DOCUMENTS

JP      2003-151016 A    5/2003
JP      2005-63172 A     3/2005
(Continued)

OTHER PUBLICATIONS

Decision to Grant a Patent dated Nov. 13, 2018 issued by the Japanese Patent Office in counterpart application No. 2017-539101.
(Continued)

*Primary Examiner* — Atiba O Fitzpatrick
(74) *Attorney, Agent, or Firm* — Sughrue Mion, PLLC

(57) ABSTRACT

Face image data is acquired and a face image is captured, and a difference between a face image indicated by the face image data and the face image that is captured or a candidate of the difference is detected on the basis of at least one of the face image indicated by the face image data that is acquired, and the face image that is captured. Guidance is acquired on the basis of the difference or the candidate of the difference which is detected, and an output unit is controlled to output the guidance.

17 Claims, 6 Drawing Sheets

(51) Int. Cl.
   *G10L 13/04* (2013.01)
   *H04N 5/232* (2006.01)
(52) U.S. Cl.
   CPC ........ *G07C 9/00079* (2013.01); *G10L 13/043* (2013.01); *H04N 5/23219* (2013.01); *G07C 9/00087* (2013.01)

(56) References Cited

U.S. PATENT DOCUMENTS

2016/0063314 A1\* 3/2016 Samet ................. G06K 9/00288 348/78
2016/0364561 A1\* 12/2016 Lee ........................ H04M 1/67

FOREIGN PATENT DOCUMENTS

| JP | 2005-149370 A | 6/2005 |
| JP | 2008-004003 A | 1/2008 |
| JP | 2008-033810 A | 2/2008 |
| JP | 2008-250829 A | 10/2008 |
| JP | 2009-176208 A | 8/2009 |
| JP | 2010-67008 A | 3/2010 |
| JP | 2010-277504 A | 12/2010 |
| JP | 201139994 A | 2/2011 |
| JP | 2013-097760 A | 5/2013 |
| JP | 2014-078052 A | 5/2014 |
| WO | 2015/001791 A1 | 1/2015 |

OTHER PUBLICATIONS

International Search Report of PCT/JP2016/074639 dated Nov. 1, 2016.
Communication dated Jul. 3, 2018 from the Japanese Patent Office in counterpart Japanese application No. 2017-539101.
Communication dated Feb. 6, 2018 from the Japanese Patent Office in counterpart Japanese application No. 2017-539101.
Communication dated Oct. 23, 2019, issued by the Japanese Patent Office in counterpart Japanese application No. 2018-233808.

\* cited by examiner

*FIG. 4*

| DIFFERENCE | HANDLING METHOD |
|---|---|
| FACIAL EXPRESSION | PLEASE, BE EXPRESSIONLESS |
| HAIR TYPE | PLEASE, ENSURE THAT HAIR DOES NOT COME INTO CONTACT WITH EYES OR THEIR EDGES |
| FACIAL HAIR | PLEASE, NOTIFY ATTENDANT |
| EYEGLASSES | PLEASE, TAKE OFF EYEGLASSES |
| MAKEUP | PLEASE, NOTIFY ATTENDANT |
| HAT | PLEASE, TAKE OFF HAT |
| SUNGLASSES | PLEASE, TAKE OFF SUNGLASSES |
| MASK | PLEASE, TAKE OFF MASK |
| EYE BANDAGE | PLEASE, TAKE OFF EYE BANDAGE |
| FACING DIRECTION (RIGHT AND LEFT) | PLEASE, FACE FRONT |
| FACING DIRECTION (UP AND DOWN) | PLEASE, FACE FRONT |
| FACING DIRECTION (OBLIQUE) | PLEASE, FACE FRONT |
| POSITIONAL DEVIATION (RIGHT AND LEFT) | PLEASE, MOVE TO RIGHT SIDE (LEFT SIDE) |
| POSITIONAL DEVIATION (UP AND DOWN) | PLEASE, BEND DOWN * CASE OF UPWARD DEVIATION PLEASE, MOVE AWAY * CASE OF DOWNWARD DEVIATION |
| DISTANCE (FAR) | PLEASE, COME CLOSER |
| DISTANCE (CLOSE) | PLEASE, STEP BACK |

GUIDANCE ACQUISITION DEVICE, GUIDANCE ACQUISITION METHOD, AND PROGRAM

CROSS-REFERENCE TO RELATED APPLICATION

This application is a continuation of U.S. application Ser. No. 15/758,136 filed on Mar. 7, 2018, which is a National Stage of International Application No. PCT/JP2016/074639 filed Aug. 24, 2016, claiming priority based on Japanese Patent Application No. 2015-177813 filed Sep. 9, 2015, the disclosure of which is incorporated herein in by reference its entirety.

TECHNICAL FIELD

The present invention relates to a guidance acquisition device, a guidance acquisition method, and a program

BACKGROUND ART

As one of identity verification methods such as for management of entrance into and exit from a predetermined area, face authentication is known. In face authentication, a face image of an authentication target is captured in advance, and the face image is compared with a face image captured in advance to perform determination of identity.

Here, several technologies for improving accuracy of the face authentication are suggested. For example, a face collation device described in Patent Document 1 includes a photographing unit that captures a face image of a person to be photographed, a light direction detection unit that detects a direction of the brightest light in front of the photographing unit, and a guide unit that guides the person to be photographed so as to stand in the direction of the light on the basis of the light direction that is detected. Patent Document 1 describes that even in a case where the face collation device is provided outdoors or in a location in which external light shines, the person to be photographed is guided to an appropriate photographing position, and thus an appropriate face image can be captured according to the above-described configuration.

CITATION LIST

Patent Literature

[Patent Document 1]
  Japanese Unexamined Patent Application, First Publication No. 2008-4003

SUMMARY OF INVENTION

Technical Problem

As a cause of a problem in which the face authentication cannot be appropriately performed, various causes are considered in addition to light direction, and thus a way to handle failure of the face authentication are different depending on the causes of a failure of the face authentication. However, there is a possibility that it is difficult to understand what is a cause when observing from an outer side of a device that performs the face authentication, and thus an appropriate response may not be performed. Particularly, there is a possibility that the authentication target cannot understand the way to handle the failure and feel stress, and some time may be taken until authentication is accepted.

An object of the invention is to provide a guidance acquisition device, a guidance acquisition method, and a program which are capable of solving the above-described problems.

Solution to Problem

According an aspect of the invention, there is provided a guidance acquisition device including: a data acquisition unit that is configured to acquire face image data; a photographing unit that is configured to capture a face image; a difference detection unit that is configured to detect a difference between a face image indicated by the face image data acquired by the data acquisition unit and the face image captured by the photographing unit or a candidate of the difference on the basis of at least one of the face image indicated by the face image data acquired by the data acquisition unit and the face image captured by the photographing unit; a guidance acquisition unit that is configured to acquire guidance on the basis of the difference or the candidate of the difference which is detected by the difference detection unit; and an output control unit that is configured to control an output unit to output the guidance that is acquired by the guidance acquisition unit.

According to another aspect of the invention, there is provided a guidance acquisition method that is executed by a guidance acquisition device including a correlation information storage unit that is configured to store correlation information that indicates a correlation between a difference between a face image indicated by face image data and a face image obtained through photographing, and guidance for a person to be photographed with respect to the difference, in advance. The method includes: a data acquisition step of acquiring the face image data; a photographing step of capturing the face image; a difference detection step of detecting the difference between the face image indicated by the face image data acquired in the data acquisition step, and the face image captured in the photographing step; a guidance acquisition step of acquiring guidance that represents guidance correlated with the difference detected in the difference detection step in the correlation information; and an output control step of controlling an output unit to output the guidance acquired in the guidance acquisition step.

According to still another aspect of the invention, there is provided a program that causes a computer including a photographing unit, and a correlation information storage unit that is configured to store correlation information that indicates a correlation between a difference between a face image indicated by face image data and a face image obtained through photographing, and guidance for a person to be photographed with respect to the difference, in advance to execute: a data acquisition step of acquiring the face image data; a photographing step of capturing the face image by the photographing unit; a difference detection step of detecting the difference between the face image indicated by the face image data acquired in the data acquisition step, and the face image captured in the photographing step; a guidance acquisition step of acquiring guidance correlated with the difference detected in the difference detection step in the correlation information; and an output control step of controlling an output unit to output the guidance acquired in the guidance acquisition step.

Advantageous Effects of Invention

According to the invention, in a case where a device that is configured to perform face authentication cannot appropriately face authentication, it is possible to increase the probability in which an authentication target can understand a way to handle a failure of the face authentication.

BRIEF DESCRIPTION OF DRAWINGS

FIG. 4 is a view showing an example of correlation information that is stored in a correlation information storage unit of the embodiment.

DESCRIPTION OF EMBODIMENTS

Hereinafter, an embodiment of the invention will be described, but the following embodiment does not limit the invention in the following appended claims. In addition, it cannot be said that the entirety of combinations of characteristics described in the embodiment are essential for the solution to problem.

Figure 1:
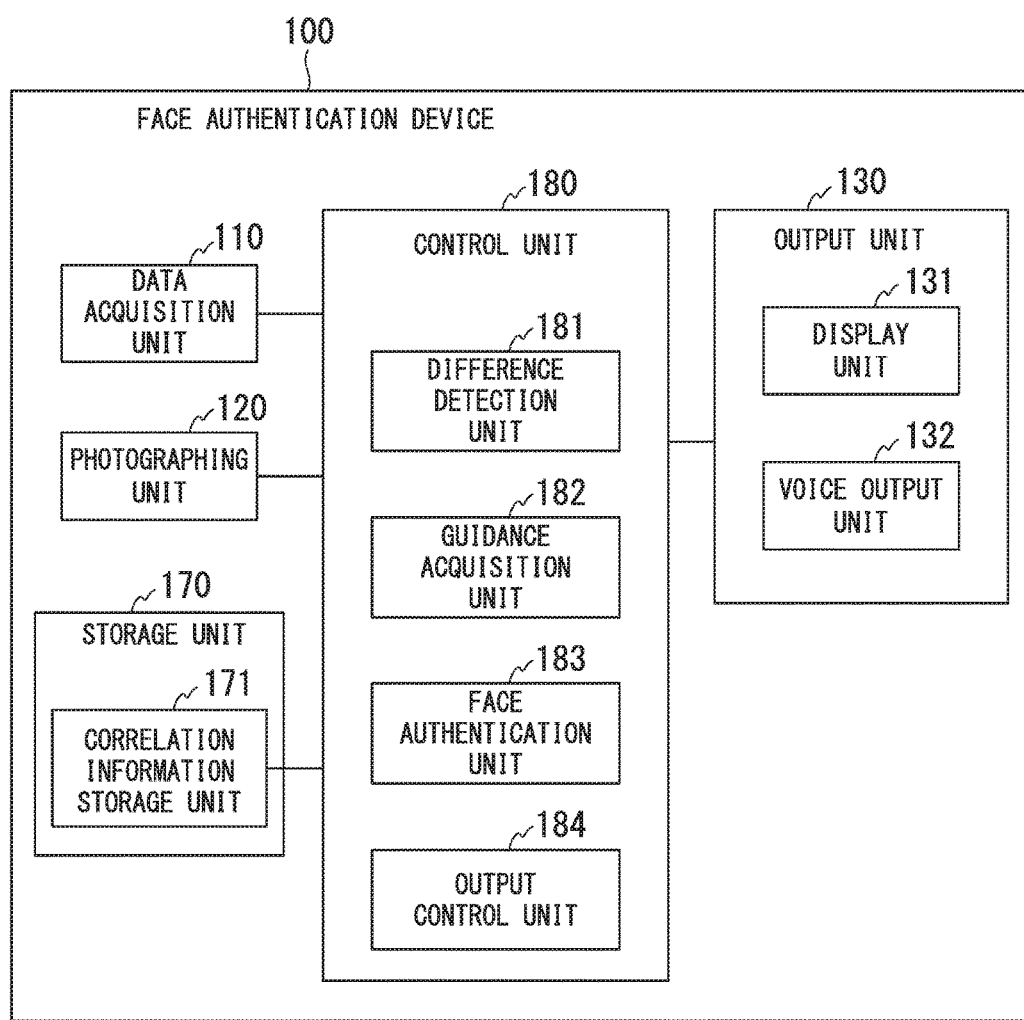
FIG. 1 is a schematic block diagram showing a functional configuration of a face authentication device according to an embodiment of the invention.

FIG. 1 is a schematic block diagram showing a functional configuration of a face authentication device in an embodiment of the invention. In the drawing, a face authentication device 100 includes a data acquisition unit 110, a photographing unit 120, an output unit 130, a storage unit 170, and a control unit 180.

The output unit 130 includes a display unit 131 and a voice output unit 132.

The storage unit 170 includes a correlation information storage unit 171.

The control unit 180 includes a difference detection unit 181, a guidance acquisition unit 182, a face authentication unit 183, and an output control unit 184.

The face authentication device 100 is a device that is configured to perform identity verification as face authentication. Hereinafter, a description will be provided of a case where the face authentication device 100 performs identity verification during immigration examination at an airport or the like as an example.

However, application fields of the face authentication device 100 are not limited to the immigration examination. For example, the face authentication device 100 may be a device that verifies whether or not authority of entrance into and exit from a specific facility is present through face authentication. In this case, the face authentication device 100 may read out face image data from identification paper (for example, an ID card) that is carried by an authentication target, and may compare the face image data with a captured image to perform the face authentication. Alternatively, the face authentication device 100 may store face image data of an entrance/exit-authorized person in advance.

In addition, the face authentication device 100 corresponds to an example of a guidance acquisition device, and output guidance in a case where an error occurs in the face authentication. The face authentication error stated here represents a case where a face authentication result cannot be obtained, that is, a case where the face authentication device 100 cannot determine whether or not an authentication target is the same person as a person shown in face authentication data. In addition, the guidance that is output by the face authentication device 100 is information that shows a method of handling the face authentication error, by the authentication target.

For example, the face authentication device 100 is realized when a computer on which a camera and the like are mounted executes a program. Alternatively, the face authentication device 100 may be configured by using dedicated hardware.

The data acquisition unit 110 acquires face image data. Specifically, the data acquisition unit 110 includes a passport reader device, and reads out face image data, which is registered in an IC (integrated circuit) chip in advance, from the IC chip that is embedded in the passport.

In addition, the data acquisition unit 110 acquires attribute data indicating attributes such as nationality, sexuality, and an age of an authentication target (a person to be captured by the photographing unit 120 (hereinafter, simply referred to a person to be photographed)) from the IC chip embedded in the passport in addition to the face image data. The attributes of the authentication target stated here represents innate characteristics of the authentication target (that is, characteristics which are determined when the authentication target was born). Examples of the attributes of the authentication target include nationality, sexuality, and age as described above.

Furthermore, the data acquisition unit 110 may acquire at least any one between the face image data and the attribute data from elsewhere other than from a passport.

For example, in a case where the face authentication device 100 is a device that verifies whether or not authority of entrance into and exit from a specific facility is present through face authentication, the data acquisition unit 110 may read out face image data (face image data indicating a face image of an authentication target) of the authentication target and attribute data (attribute data indicating an attribute of the authentication target) of the authentication target, from identification paper (for example, an ID card).

Alternatively, the storage unit 170 may store the face image data and the attribute data in advance (before the face authentication device 100 performs the face authentication), and the data acquisition unit 110 may read out the face image data of the authentication target and the attribute data of the authentication target from the storage unit 170.

Furthermore, acquisition of the attribute data of the authentication target by the data acquisition unit 110 is not an essential requirement. The data acquisition unit 110 may acquire at least the face image data.

The photographing unit 120 is provided with a camera to perform photographing. Particularly, the photographing unit 120 repetitively captures the face image of the authentication target. The repetitive photographing stated here may be photographing capable of repetitively obtaining the face image. For example, the photographing unit 120 may photograph a moving image, and may repeat capturing of a still image at predetermined time intervals (for example, every second).

The output unit 130 outputs information. Particularly, the output unit 130 outputs guidance.

The output of the guidance stated here may be an output of a signal indicating the guidance. Alternatively, the output of the guidance stated here may be presentation of guidance in an aspect in which the authentication target can understand guidance such as display of guidance and voice output of guidance.

For example, the display unit 131 includes a display screen such as a liquid crystal panel and a light-emitting diode (LED) panel, and displays various images. Particularly, the display unit 131 displays a face image indicated by face image data that is acquired by the data acquisition unit 110, and a face image (face image obtained through photographing performed by the photographing unit 120) that is captured by the photographing unit 120. In addition, the display unit 131 displays guidance.

Display of the guidance by the display unit 131 corresponds to an example of the output of the guidance.

Figure 2:
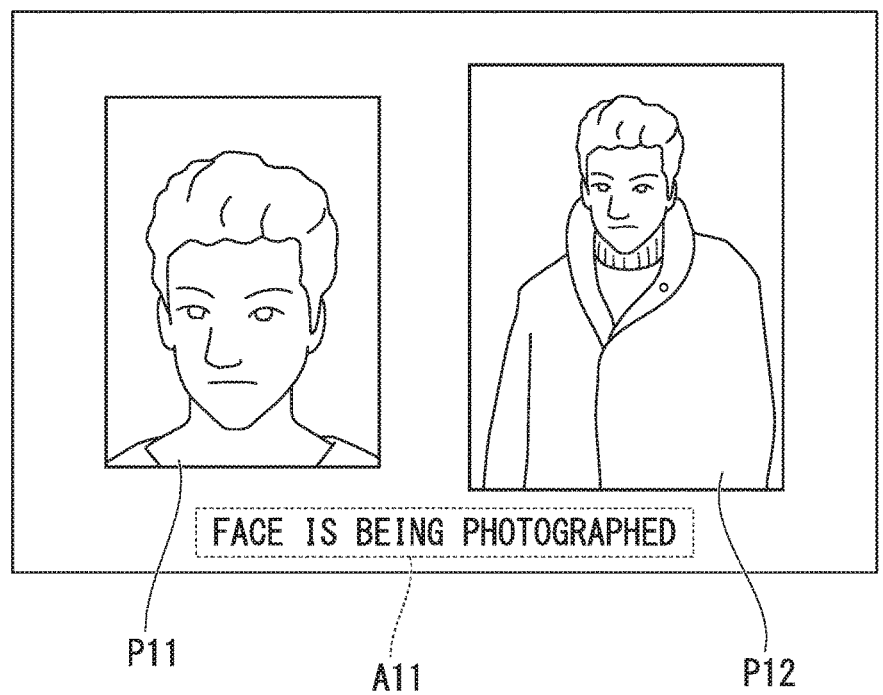
FIG. 2 is a view showing an example of a display screen image of a display unit in a state in which the face authentication device of the embodiment is in execution of the face authentication.

FIG. 2 is a view showing an example of a display screen image of the display unit 131 in a state in which the face authentication device 100 is in execution of the face authentication. An image P11 represents an example of a face image (a face image indicated by face image data that is acquired by the data acquisition unit 110) of a passport. The face image of the passport is an image that is used in face authentication. When the display unit 131 displays the face image of the passport, and a person to be photographed (authentication target) adjusts their facial expression, their position, and the like to the facial expression, position, and the like at the time of capturing the face image of the passport, it is possible to reduce the probability of an error occurring in the face authentication.

In addition, the image P12 represents an example of an image obtained by horizontally inverting an image captured by the photographing unit 120. Since the display unit 131 displays an image that is obtained by horizontally inverting the latest image captured by the photographing unit 120, in a case where a position of the person to be photographed deviates in a horizontal direction with respect to a position of the photographing unit 120 (a photographing range of the photographing unit 120), the person to be photographed can intuitively understand to which of a left direction or a right direction is deviated. Furthermore, the image P12 may display the latest image captured by the photographing unit 120 as is without the horizontal inversion.

In addition, the display unit 131 displays a message of "your face is being photographed" in a region A11. Since the display unit 131 displays the message, the person to be photographed can understand that the face authentication device 100 is in execution of the face authentication.

Figure 3:
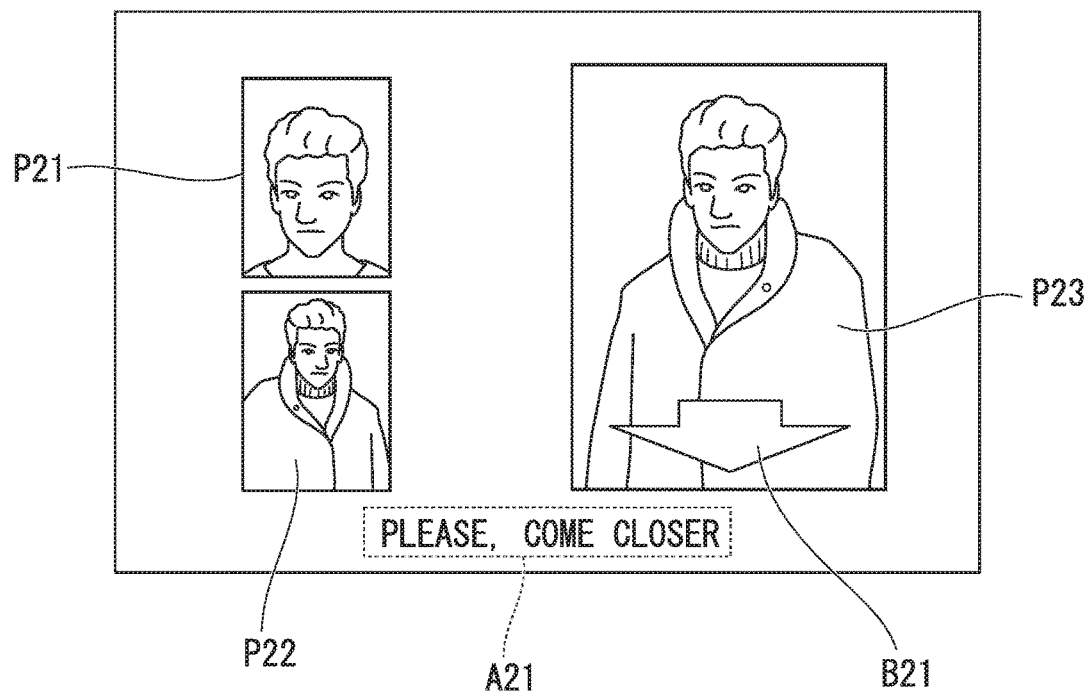
FIG. 3 is a view showing an example of a display screen image of the display unit in a case where an error occurs in the face authentication of the face authentication device of the embodiment.

FIG. 3 is a view showing an example of a display screen image of the display unit 131 in a case where an error occurs in the face authentication by the face authentication device 100. An image P21 represents an example of the face image (face image indicated by the face image data that is acquired by the data acquisition unit 110) of the passport. In addition, an image P22 represents an example of an image that is used in the face authentication by the face authentication device 100 among images captured by the photographing unit 120. Both of the images P21 and P22 are images which are used in the face authentication by the face authentication device 100. As described above, since the display unit 131 displays the two images which are used in the face authentication, the authentication target can estimate the cause of an error by comparing the two images.

In addition, the image P23 represents an example of an image obtained by horizontally inverting the latest image captured by the photographing unit 120. When the display unit 131 displays the face image of the passport and the latest image captured by the photographing unit 120, and the authentication target detects a difference between the two images and takes countermeasures to reduce the difference, it is possible to reduce the probability of an error occurring in the face authentication performed by the face authentication device 100.

Furthermore, the image P23 may be an image which is displayed as it is without horizontal inverting the latest image captured by the photographing unit 120.

In addition, the display unit 131 displays a message of "please, come closer" in a region A21. The message corresponds to an example of the guidance, and shows a handling method in which the person to be photographed approaches the camera of the photographing unit 120.

In addition, the display unit 131 displays an arrow B21. The arrow B21 also corresponds to an example of the guidance, and shows a handling method in which the person to be photographed approaches the camera of the photographing unit 120 as in the message in the region A21.

As described above, when the display unit 131 displays the guidance through display of an icon such as an arrow, various persons to be photographed, who use different languages, can understand the guidance. For example, when the display unit 131 displays a movement direction of the person to be photographed with an arrow, various persons to be photographed, who use different languages, can understand the movement direction.

The voice output unit 132 includes a speaker and outputs sound. Particularly, the voice output unit 132 outputs the guidance with a voice.

Furthermore, a method of outputting the guidance by the face authentication device 100 is not limited to display or voice output of the guidance. For example, the output unit 130 may be constituted as a device independent from the face authentication device 100, and the face authentication device 100 may allow the output unit 130 to output (transmit) a signal indicating the guidance.

The storage unit 170 is constituted by using a storage device that is provided in the face authentication device 100, and stores various pieces of information.

The correlation information storage unit 171 stores correlation information. The correlation information that is stored in the correlation information storage unit 171 is information indicating a correlation between a difference between the face image (face image indicated by the face image data acquired by the data acquisition unit 110) of the passport and the face image captured by the photographing unit 120, and the guidance for the person to be photographed with regard to the difference.

FIG. 4 is a view showing an example of the correlation information that is stored in the correlation information storage unit 171.

The correlation information storage unit 171 shown in the drawing has a table-type data structure, and a difference column and a handling method column are included in each row.

The difference column is a column in which information indicating a difference between the face image of the passport and the face image captured by the photographing unit 120 is stored. In addition, the handling method column is a column in which information indicating a handling method of the person to be photographed (authentication target) with regard to the difference shown in the difference column is stored. The information stored in the handling method column corresponds to an example of the guidance for the person to be photographed.

As described above, in the correlation information, a difference between the face image indicated by the face image data acquired by the data acquisition unit 110 and the face image captured by the photographing unit 120, and the guidance for the person to be photographed with regard to the difference are correlated in every row.

For example, in a case where the face image of the passport and the face image captured by the photographing unit 120 are different in facial expression, as a handling method of the person to be photographed, it can be considered that the person to be photographed shows the same facial expression as in the face image of the passport such as being expressionless. Accordingly, as a handling method in a case where the difference is "facial expression", the correlation information in FIG. 4 shows a handling method of "please, be expressionless".

In addition, as a handling method in a case where it is difficult to immediately eliminate the difference between the face image of the passport and the face image captured by the photographing unit 120, the correlation information in FIG. 4 shows a handling method of "please, notify an attendant".

For example, in a case where a facial hair is not present in the face image of the passport, but the facial hair is shown in the face image captured by the photographing unit 120, it is considered that it is difficult to take countermeasures by saving off the facial hair in that situation. Accordingly, as a handling method for a case where the difference is "facial hair", the correlation information in FIG. 4 shows a handling method of "please, notify an attendant". When the face authentication device 100 outputs (for example, displays) the handling method, the authentication target can be made aware that a handling method is contacting the attendant to inquire a countermeasure method.

Furthermore, the correlation information that is stored in the correlation information storage unit 171 is not limited to storage of information indicating a handling method of the person to be photographed as guidance for the person to be photographed. For example, the correlation information storage unit 171 may store correlation information that includes information indicating a difference between the face image of the passport and the face image captured by the photographing unit 120 as the guidance for the person to be photographed. In this case, the information indicating the difference between the face image of the passport and the face image captured by the photographing unit 120 corresponds to an example of the guidance.

For example, the display unit 131 may display the face image of the passport, and guidance of "the facial expression is different". In this case, the person to be photographed can understand and execute a handling method of showing the same facial expression as in the face image of the passport with reference to the face image of the passport.

The control unit 180 controls respective units of the face authentication device 100 to perform various kinds of processing. For example, the control unit 180 is realized when a central processing unit (CPU) of the face authentication device 100 reads out a program from the storage unit 170 and executes the program.

The difference detection unit 181 detects the difference between the face image indicated by the face image data acquired by the data acquisition unit 110, and the face image captured by the photographing unit 120, or a candidate of the difference on the basis of at least one of the face image indicated by the face image data acquired by the data acquisition unit 110, and the face image captured by the photographing unit 120.

Particularly, the difference detection unit 181 may detect the candidate of the difference on the basis of the face image indicated by the face image data acquired by the data acquisition unit 110. For example, in a case where the face image of the passport which is acquired by the data acquisition unit 110 is an eyeglass wearing image, the difference detection unit 181 may detect wearing or non-wearing of eyeglasses as the candidate of the difference.

In a case where the difference detection unit 181 detects the candidate, for example, the display unit 131 displays the face image of the passport in a manner of emphasizing eyeglasses, and thus the person to be photographed can be made aware of necessity to wear eyeglasses. When the person to be photographed, who does not wear eyeglasses, wears eyeglasses, it is possible to reduce the probability of an error occurring in the face authentication performed by the face authentication device 100.

In addition, in this case, even in a state in which the photographing unit 120 does not photograph the face of the person to be photographed, the difference detection unit 181 can detect the candidate of the difference. Accordingly, at an early stage, for example, before the person to be photographed stands within a photographing range of the photographing unit 120, the display unit 131 can display a suggestion to wear eyeglasses.

Alternatively, the difference detection unit 181 may detect the difference between the face image indicated by the face image data acquired by the data acquisition unit 110, and the face image captured by the photographing unit 120, or the candidate of the difference on the basis of the face image captured by the photographing unit 120. For example, in a case where the face image captured by the photographing unit 120 is a mask-wearing face image, the difference detection unit 181 may detect wearing or non-wearing of the mask as the candidate of the difference. In a case where the difference detection unit 181 detects the candidate, for example, the display unit 131 displays a message of "please, take off the mask", and thus the person to be photographed can be made aware of necessity to take off the mask. When the person to be photographed takes off the mask, it is possible to reduce the probability of an error occurring in the face authentication that is performed by the face authentication device 100.

In addition, in this case, even in a state in which the data acquisition unit 110 does not acquire data of the face image, the difference detection unit 181 can detect the candidate of the difference. Accordingly, at an early stage, for example, before the person to be photographed brings the passport into contact with a passport reader device, the display unit 131 can display a suggestion to take off the mask.

Furthermore, the difference detection unit 181 may detect the candidate of the difference other than the wearing or non-wearing of the mask by detecting that the face image captured by the photographing unit 120 faces a lateral side.

Alternatively, the difference detection unit 181 may detect the difference between the face image indicated by the face image data acquired by the data acquisition unit 110 and the face image captured by the photographing unit 120. Particularly, in a case where an error occurs in the face authentication that is performed by the face authentication unit 183, the difference detection unit 181 detects a difference that becomes the cause of the face authentication error, the difference being the difference between the face image indicated by the face image data acquired by the data acquisition unit 110 and the face image captured by the photographing unit 120. A description will be provided of the difference that is detected by the difference detection unit 181 with reference to FIG. 5 and FIG. 6.

Figure 5:
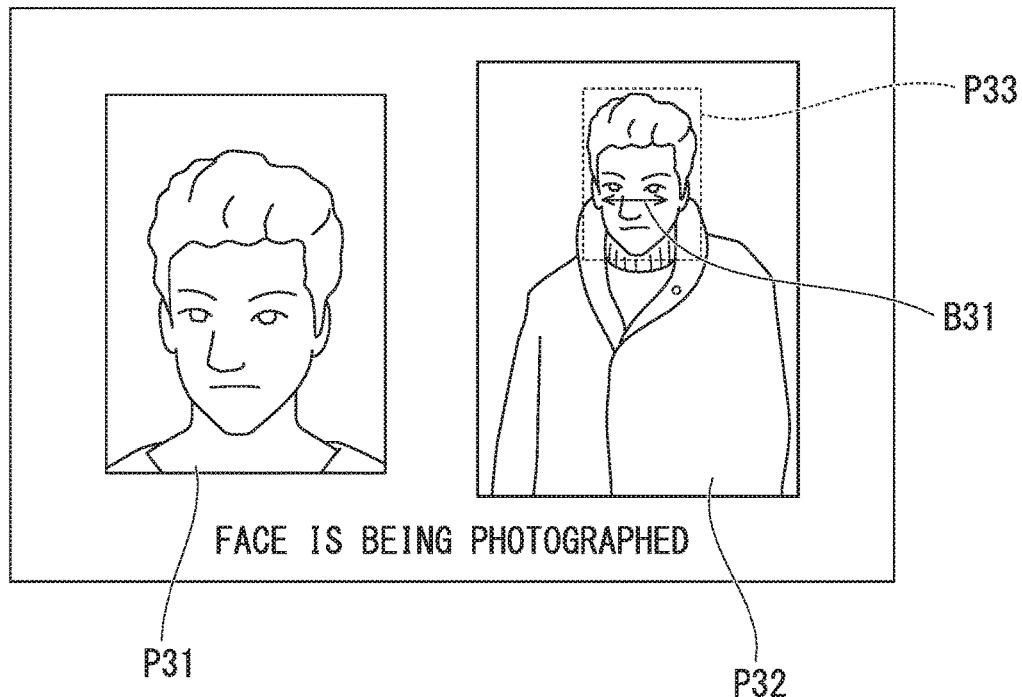
FIG. 5 is a view showing an example of an image that is captured by a photographing unit in a case where a distance between a person to be photographed and the photographing unit is long in the embodiment.

FIG. 5 is a view showing an example of an image that is captured by the photographing unit 120 in a case where a distance between the person to be photographed and the photographing unit 120 is long. In the drawing, an example of a display screen image (image that is displayed on the display screen by the display unit 131) of the display unit 131 is shown. An image P31 represents an example of a face image (face image indicated by the face image data acquired by the data acquisition unit 110) of the passport. In addition, an image P32 represents an example of an image obtained by horizontally inverting an image captured by the photographing unit 120. In an example of FIG. 5, the photographing unit 120 is capturing an image of the person to be photographed which includes a face image (image P33) of the person to be photographed.

For example, the difference detection unit 181 detects a position of eyes in the image captured by the photographing unit 120, and extracts a face portion in the image captured by the photographing unit 120.

In addition, the difference detection unit 181 determines whether or not a gap size (length indicated by an arrow B31) between a left eye and a right eye is smaller than a gap threshold value, and whether or not a size of the face portion is smaller than a face portion threshold value. Here, the gap threshold value and the face portion threshold value are predetermined threshold values (for example, constants) which are set as threshold values in determination as to whether or not the distance between the person to be photographed and the photographing unit 120 is long. In addition, the size of the face portion may be any one of an area of the image of the face portion, a vertical length of the image of the face portion, and a horizontal width of the image of the face portion, or a combination thereof.

Between two conditions such things as the size of the gap between the left eye and the right eye is smaller than the gap threshold value, and the size of the face portion is smaller than the face portion threshold value, in a case where it is determined that one or more conditions are satisfied, the difference detection unit 181 determines (detects) that the distance between the person to be photographed and the photographing unit 120 is long.

Furthermore, the difference in which the distance between the person to be photographed and the photographing unit 120 is long corresponds to a difference of "distance (far)" in the example of FIG. 4.

Furthermore, a method in which the difference detection unit 181 detects the difference in which the distance between the person to be photographed and the photographing unit 120 is long is not limited to the above-described method. For example, the difference detection unit 181 may detect the difference in which the distance between the person to be photographed and the photographing unit 120 is long on the basis of only any one of the gap size between the left eye and the right eye, and the size of the face portion.

Figure 6:
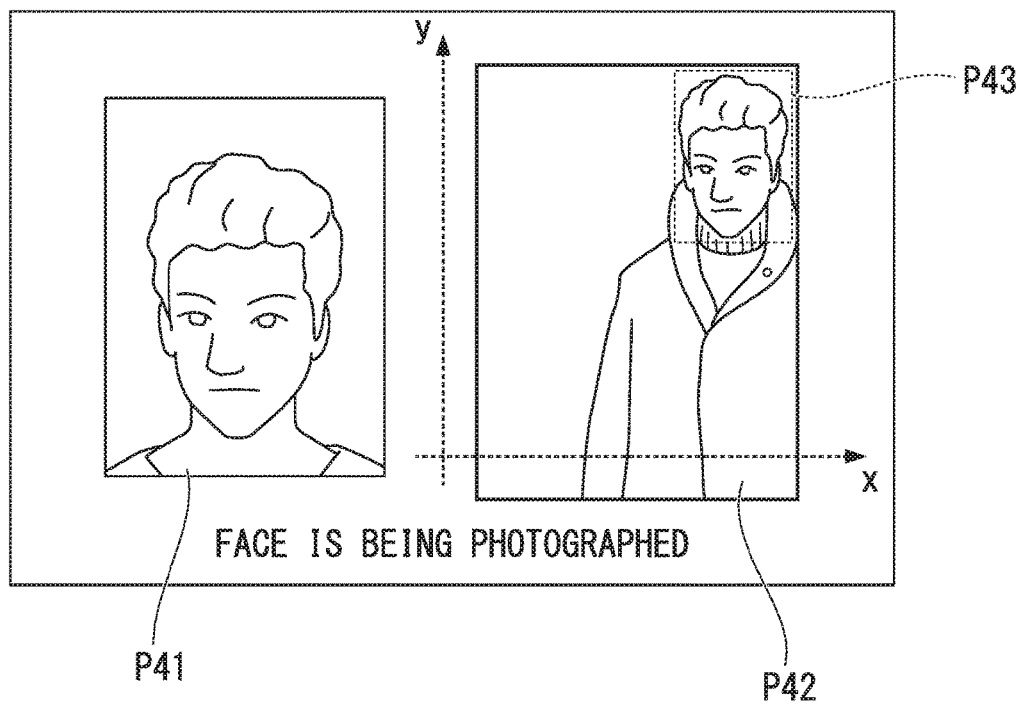
FIG. 6 is a view showing an example of an image that is captured by the photographing unit in a case where a position of the person to be photographed deviates in a horizontal direction in the embodiment.

FIG. 6 is a view showing an example of an image that is captured by the photographing unit 120 in a case where a position of the person to be photographed deviates in a horizontal direction. The drawing shows an example of a display screen image of the display unit 131. An image P41 represents an example of a face image (face image acquired by the data acquisition unit 110) of the passport. In addition, an image P42 represents an example of an image obtained by horizontally inverting an image captured by the photographing unit 120. In the example of FIG. 6, the photographing unit 120 is capturing an image of the person to be photographed which includes a face image (image P43) of the person to be photographed. In addition, an x-axis is a coordinate axis in a horizontal direction in the image P42. A y-axis is a coordinate axis in a vertical direction in the image P42.

For example, the difference detection unit 181 detects a position of eyes in the image captured by the photographing unit 120, and extracts a face portion in the image captured by the photographing unit 120.

In addition, the difference detection unit 181 determines whether or not the x-coordinate of the left eye is greater than a rightward deviation threshold value of the left eye coordinates, whether or not the x-coordinate of the right eye is greater than a rightward deviation threshold value of the right eye coordinates, and whether or not an x-coordinate of the face portion (for example, an average value of an x-coordinate on a left end and a y-coordinate on a right end in a region extracted as the face portion) is greater than a rightward deviation threshold value of the face portion coordinates.

Here, the rightward deviation threshold value of the left eye coordinates, the rightward deviation threshold value of the right eye coordinates, and the rightward deviation threshold value of the face portion coordinates are predetermined threshold values (for example, constants) which are set as threshold values in determination as to whether or not a position of the person to be photographed deviates to the right side with respect to the photographing unit 120 when seen from the person to be photographed.

Among three conditions including a condition in which the x-coordinate of the left eye is greater than the rightward deviation threshold value of the left eye coordinates, a condition in which the x-coordinate of the right eye is greater than the rightward deviation threshold value of the right eye coordinates, and a condition in which the x-coordinate of the face portion is greater than the rightward deviation threshold value of the face portion coordinates, in a case where it is determined that one or more conditions are satisfied, the difference detection unit 181 determines (detects) that the position of the person to be photographed deviates to a right side with respect to photographing unit 120 when seen from the person to be photographed.

Similarly, among three conditions including a condition in which the x-coordinate of the left eye is less than a leftward deviation threshold value of the left eye coordinates, a condition in which the x-coordinate of the right eye is less than a leftward deviation threshold value of the right eye coordinates, and a condition in which the x-coordinate of the face portion is less than a leftward deviation threshold value of the face portion coordinates, in a case where it is determined one or more conditions are satisfied, the difference detection unit 181 determines (detects) that the position of the person to be photographed deviates to a left side with respect to photographing unit 120 when seen from the person to be photographed.

Here, the leftward deviation threshold value of the left eye coordinates, the leftward deviation threshold value of the right eye coordinates, and the leftward deviation threshold value of the face portion coordinates are predetermined threshold values (for example, constants) which are set as threshold values in determination as to whether or not the position of the person to be photographed deviates to the left side with respect to the photographing unit 120 when seen from the person to be photographed.

Furthermore, the difference in which the position of the person to be photographed deviates to the right side with respect to the photographing unit 120 when seen from the person to be photographed corresponds to a positional deviation (right) in a "positional deviation (right and left)" in the example of FIG. 4.

In this case, the output unit 130 outputs (for example, displays) a handling method of "please, move to the left side".

In addition, the difference in which the position of the person to be photographed deviates to the left side with respect to the photographing unit 120 when seen from the person to be photographed corresponds to a positional deviation (left) in the "positional deviation (right and left)" in the example of FIG. 4.

In this case, the output unit 130 outputs (for example, displays) a handling method of "please, move to the right side".

Furthermore, a method in which the difference detection unit 181 detects a difference in which the position of the person to be photographed deviates in a horizontal direction is not limited to the above-described method.

For example, the difference detection unit 181 may detect the difference in which the position of the person to be photographed deviates in the horizontal direction (deviates to a left side, or deviates to a right side) on the basis of one or more among an x-coordinate of a left ear, an x-coordinate of a right ear, an x-coordinate of a nose, and an x-coordinate of a mouth instead of the x-coordinate of the left eye, the x-coordinate of the right eye, and the x-coordinate of the face portion or in addition to one or more among the x-coordinates.

Furthermore, as the x-coordinate of the face portion, the difference detection unit 181 may use an x-coordinate of the center of the portion, or an x-coordinate of a left end of the portion, or an x-coordinate of a right end of the portion.

The guidance acquisition unit 182 acquires guidance on the basis of the difference that is detected by the difference detection unit 181, or a candidate of the difference.

For example, as described above, in a case where the difference detection unit 181 detects that the face image of the passport is an eyeglass-wearing face image, the guidance acquisition unit 182 may acquire information indicating processing of displaying the face image of the passport in a manner of emphasizing eyeglasses. In order for the difference detection unit 181 to acquire the information, the difference detection unit 181 or the storage unit 170 stores information, in which a candidate of the difference in which the face image of the passport is the eyeglass-wearing face image (candidate of the difference between wearing and non-wearing of eyeglasses), and the processing of displaying the face image of the passport in the manner of emphasizing the eyeglasses are correlated with each other, in advance.

Furthermore, displaying of the face image of the passport in the manner of emphasizing the eyeglasses corresponds to an example of the guidance that suggests the person be photographed wearing eyeglasses.

Alternatively, as described above, in a case where the difference detection unit 181 detects that the face image captured by the photographing unit 120 is a mask-wearing face image, the guidance acquisition unit 182 may acquire a message of "please, take off the mask". In order for the difference detection unit 181 to acquire the message, the difference detection unit 181 or the storage unit 170 may store information, in which a candidate of the difference corresponding to the fact that the face image captured by the photographing unit 120 is the mask-wearing face image (candidate of the difference between wearing and non-wearing of the mask), and the message of "please, take off the mask" are correlated with each other, in advance.

Furthermore, the message "please, take off the mask" corresponds to an example of guidance that suggests the person be photographed without a mask.

Alternatively, as described above, in a case where the difference detection unit 181 detects that the face image captured by the photographing unit 120 is a lateral face image, the guidance acquisition unit 182 may acquire a message of "please, face the front". Alternatively, in this case, the guidance acquisition unit 182 may acquire information indicating processing of presenting a position of the camera to the person to be photographed.

Alternatively, the guidance acquisition unit 182 acquires guidance that is correlated with the difference detected by the difference detection unit 181 in correlation information.

For example, the correlation information storage unit 171 stores correlation information in which a difference between the image of the passport and the image that is captured by the photographing unit 120, and a message as guidance are correlated. In addition, the guidance acquisition unit 182 fetches the message as the guidance from the correlation information to acquire the guidance.

Alternatively, the guidance acquisition unit 182 may acquire the guidance by a method other than the method of fetching the guidance from the correlation information. For example, the guidance acquisition unit 182 may fetch the message from the correlation information, and may translate the message into a language which the authentication target uses to acquire the guidance.

In addition, for example, the data acquisition unit 110 may fetch attribute data indicating the nationality of the authentication target from the passport, and may translate the message into a language corresponding to the nationality that is fetched to acquire the guidance of a language corresponding to the nationality. As described above, the guidance acquisition unit 182 may acquire guidance corresponding to attribute indicated by the attribute data that is acquired by the data acquisition unit 110.

Furthermore, the correlation information storage unit 171 may store the message according to each of a plurality of languages as the guidance in correlation information, and the guidance acquisition unit 182 may fetch a message in a language corresponding to the nationality that is fetched by the data acquisition unit 110 from the correlation information.

The face authentication unit 183 performs the face authentication by using the face image indicated by the face image data that is acquired by the data acquisition unit 110, and the face image that is captured by the photographing unit 120. The face authentication unit 183 performs identity verification of the authentication target through the face authentication. That is, the face authentication unit 183 determines whether or not a person of the face image indicated by the face image data that is acquired by the data acquisition unit 110, and a person indicated by the face image that is captured by the photographing unit 120 are the same person.

Furthermore, the face authentication unit 183 may be constituted as a part of the face authentication device 100, or a device independent from the face authentication device 100.

The output control unit 184 controls the output unit 130 in order for the output unit 130 to output the guidance acquired by the guidance acquisition unit 182.

Furthermore, as in the above-described example, in a case where the face image indicated by the face image data acquired by the data acquisition unit 110 is the eyeglass-wearing image, the output control unit 184 may control the output unit 130 in order for the output unit 130 to output an eyeglass-wearing instruction that recommends the person to be photographed to wear eyeglasses. When the person to be photographed wears the eyeglasses in response to the eyeglass-wearing instruction, it is possible to reduce the probability of an error occurring in the face authentication that is performed by the face authentication unit 183.

In addition, the output control unit 184 allows the display unit 131 to display the face image indicated by the face image data acquired by the data acquisition unit 110. In addition, the output control unit 184 may control the output unit 130 in order for the output unit 130 to output a condition adjusting instruction that recommends the person to be photographed to adjust conditions, under which the photographing unit 120 captures the face image, to conditions shown in the face image displayed by the display unit 131.

For example, in the example of the eyeglass-wearing instruction, the output control unit 184 may allow the display unit 131 to display the face image (face image indicated by the face image data acquired by the data acquisition unit 110) of the passport.

The person to be photographed can confirm instruction contents of the condition adjusting instruction with reference to the face image by displaying the face image of the passport by the display unit 131.

In addition, the output control unit 184 may control the output unit 130 in order for the output unit 130 to output difference information indicating the difference that is detected by the difference detection unit 181. For example, as described above, the output control unit 184 may control the display unit 131 in order for the display unit 131 to display guidance of "facial expression is different".

According to this, the person to be photographed can understand the difference between the face image of the passport and the face image captured by the photographing unit 120. When the person to be photographed understands the difference, it is possible to increase the probability of understanding a handling method for the difference (for example, a handling method of reducing the difference).

In addition, the output control unit 184 may allow the display unit 131 to display a portion different between the face image (face image indicated by the face image data acquired by the data acquisition unit 110) of the passport and the face image captured by the photographing unit 120 as difference information that is shown in any one or both of the face image of the passport and the face image captured by the photographing unit 120.

For example, in a case where the face image of the passport does not wear eyeglasses, and the face image captured by the photographing unit 120 wears eyeglasses, the display unit 131 may display the eyeglasses on the face image of the passport with a broken line, or may perform emphasizing display such things as the eyeglasses in the face image captured by the photographing unit 120 are surrounded by a broken line in accordance with the control of the output control unit 184.

According to this, the person to be photographed can more reliably understand a difference between the face image of the passport and the face image captured by the photographing unit 120, and it is possible to increase the probability that the person to be photographed can understand a handling method for the difference (for example, a handling method of reducing the difference).

In addition, the output control unit 184 may allow the display unit 131 to display an image including the face image (face image indicated by the face image data acquired by the data acquisition unit 110) of the passport, the latest face image captured by the photographing unit 120, and display of guidance acquired by the guidance acquisition unit 182.

The image P21 in FIG. 3 corresponds to an example of the face image of the passport. In addition, the image P23 in FIG. 3 corresponds to an example of the latest face image captured by the photographing unit 120. In addition, display of a message in the region A21 in FIG. 3 corresponds to an example of the display of guidance acquired by the guidance acquisition unit 182.

In addition, the output control unit 184 may allow the display unit 131 to display an image including a face image which is captured by the photographing unit 120 and is used in the face authentication by the face authentication unit 183, and in which an error occurs in the face authentication, the latest face image that is captured by the photographing unit 120, and display of the guidance that is acquired by the guidance acquisition unit 182.

The image P22 in FIG. 3 corresponds to an example of the face image which is captured by the photographing unit 120 and is used in the face authentication by the face authentication unit 183, and in which an error occurs in the face authentication. In addition, the image P23 in FIG. 3 corresponds to an example of the latest face image that is captured by the photographing unit 120. In addition, display of a message in the region A21 in FIG. 3 corresponds to an example of the display of the guidance that is acquired by the guidance acquisition unit 182.

According to this, the person to be photographed can confirm whether or not the cause of an error in the face image, which is captured by the photographing unit 120 and is used in the face authentication by the face authentication unit 183, and in which an error occurs in the face authentication, is eliminated in the latest face image that is captured by the photographing unit 120.

In addition, the output control unit 184 may allow the display unit 131 to display an image including the face image (face image indicated by the face image data acquired by the data acquisition unit 110) of the passport, the face image which is captured by the photographing unit 120 and is used in the face authentication by the face authentication unit 183, and in which an error occurs in the face authentication, the latest face image captured by the photographing unit 120, and display of the guidance acquired by the guidance acquisition unit 182.

The image P21 in FIG. 3 corresponds to an example of the face image of the passport. In addition, the image P22 in FIG. 3 corresponds to an example of the face image which is captured by the photographing unit 120 and is used in the face authentication by the face authentication unit 183, and in which an error occurs in the face authentication. In addition, the image P23 in FIG. 3 corresponds to an example of the latest face image captured by the photographing unit 120. In addition, display of a message in the region A21 in FIG. 3 corresponds to an example of display of the guidance acquired by the guidance acquisition unit 182.

In addition, the output control unit 184 may allow the display unit 131 to display the guidance acquired by the guidance acquisition unit 182 with text information. According to this, the person to be photographed can understand the guidance through reading-out of display of the guidance with the text information.

Display of a message in the region A21 in FIG. 3 corresponds to an example of display of the guidance acquired by the guidance acquisition unit 182 with the text information.

In addition, the output control unit 184 may allow the display unit 131 to display the guidance for the person to be photographed with an icon. Display of the arrow B21 in FIG. 3 corresponds to an example of the icon display of the guidance for the person to be photographed.

In addition, the correlation information storage unit 171 may store correlation information in which a difference in a face position between the face image (face image indicated by the face image data acquired by the data acquisition unit 110) of the passport and the face image captured by the photographing unit 120, and guidance representing a direction in which the person to be photographed moves the face to reduce the difference in the face position are correlated with each other. In addition, in a case where the difference detection unit 181 detects the difference in the face position between the face image of the passport and the face image captured by the photographing unit 120, the output control unit 184 may allow the display unit 131 to display guidance that shows a direction in which the person to be photographed moves (particularly, the face is moved) with an arrow.

Display of the arrow B21 in FIG. 3 corresponds to an example of display of the guidance that shows the direction in which the person to be photographed moves the face with an arrow.

In addition, the output control unit 184 may allow the voice output unit 132 to output the guidance at least with a voice.

According to this, even in a case where the person to be photographed is not looking at the display screen of the display unit 131, or cannot see the display screen of the display unit 131 due to visual impairment and the like, the person to be photographed can understand the guidance.

In addition, the output control unit 184 may allow the output unit 130 to output an alarm indicating that the output unit 130 outputs the guidance. For example, the output control unit 184 may allow the display unit 131 to display the guidance, and may allow the voice output unit 132 to output a voice message of "please, check guidance". According to this, it is possible to reduce the probability that the person to be photographed erroneously understand the guidance (for example, the probability that display of the guidance may be overlooked).

Figure 7:
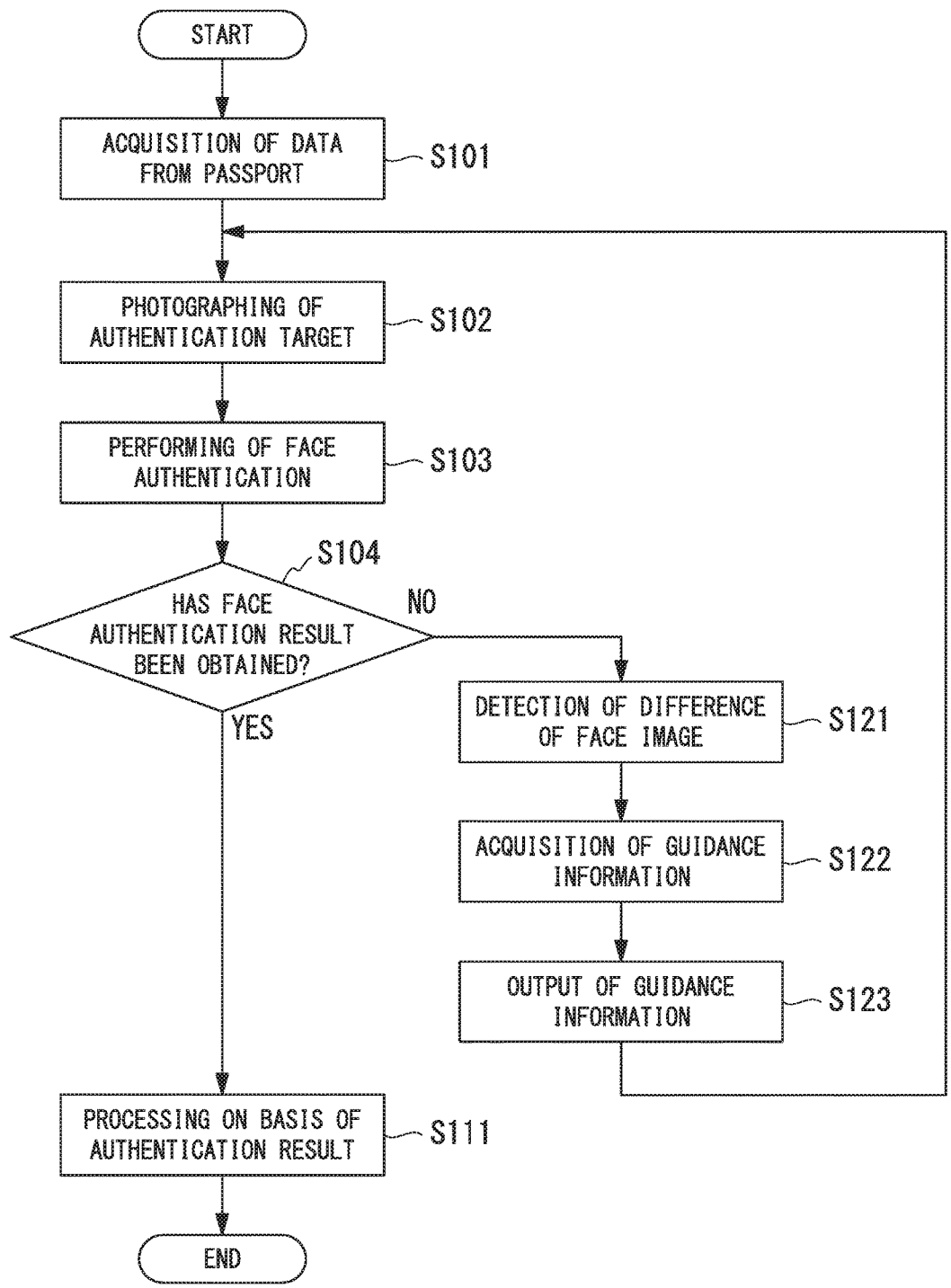
FIG. 7 is a flowchart showing an example of a processing procedure that is performed by the face authentication device of the embodiment.

Next, a description will be provided of an operation of the face authentication device 100 with reference to FIG. 7. FIG. 7 is a flowchart showing an example of a procedure of processing that is executed by the face authentication device 100. For example, when the passport is placed on a passport reader device of the data acquisition unit 110, the face authentication device 100 initiates the processing in the drawing.

In the processing in FIG. 7, the data acquisition unit 110 reads out data from an IC chip that is embedded in the passport (step S101). Particularly, the data acquisition unit 110 reads out image data of the face image (face image of the passport), which is registered in advance, from the IC chip.

In addition, the photographing unit 120 photographs an authentication target (person to be photographed) with a camera to acquire a face image (step S102).

In addition, the face authentication unit 183 performs face authentication by using the face image indicated by the image data acquired by the data acquisition unit 110, and the face image captured by the photographing unit 120 (step S103).

In addition, the face authentication unit 183 determines whether or not a result of the face authentication can be obtained, or an error has occurred in the face authentication (step S104).

In a case where it is determined that the result of the face authentication can be obtained (YES in step S104), the face authentication device 100 performs processing based on the authentication result (step S111).

For example, in a case where authentication succeeds (that is, in a case where it is determined that the authentication target is the same as a person described in the passport), the face authentication device 100 displays a message indicating that immigration is permitted. In addition, the face authentication device 100 allows a door of a gate to be opened in order for the authentication target to pass through the gate. On the other hand, in a case where the authentication fails (that is, in a case where it is determined that the authentication target is different from the person described in the passport), the face authentication device 100 displays a message that recommends the authentication target to contact an attendant.

After step S111, the processing in FIG. 7 is terminated.

On the other hand, in a case where it is determined that an error has occurred in the face authentication (NO in step S104), the difference detection unit 181 detects a difference between the face image obtained from the passport in step S101, and the face image captured by the photographing unit 120 in step S102 (step S121).

In addition, the guidance acquisition unit 182 acquires guidance representing a handling method with respect to the difference obtained in step S121 (step S122). For example, as described above, the correlation information storage unit 171 stores correlation information in which the difference between the face images, and the guidance representing the handling method with respect to the difference are correlated with each other. In addition, the guidance acquisition unit 182 fetches the guidance, which is correlated with the difference obtained in step S121, from the correlation information.

In addition, the output unit 130 outputs the guidance obtained in step S122 in accordance with a control of the output control unit 184 (step S123).

After step S123, the processing returns to step S102.

Furthermore, in a case where an error occurs predetermined number of times or more, the face authentication device 100 may perform predetermined processing such as displaying of a message that recommends the authentication target to contact an attendant.

Specifically, the face authentication unit 183 counts the number of times of determination as occurrence of an error in the face authentication in step S104, and determines whether or not the number of times is equal to or more than predetermined number of times. In a case where it is determined that the number of times of determination as occurrence of an error in the face authentication in step S104 is equal to or more than the predetermined times, for example, the output control unit 184 allows the display unit 131 to display a message that recommends the authentication target contact the attendant.

According to this, the face authentication device 100 can handle with a case where it is difficult to eliminate the error in the face authentication.

As described above, the data acquisition unit 110 acquires the face image data. In addition, the photographing unit 120 captures the face image of the authentication target. In addition, the correlation information storage unit 171 stores correlation information, which represents a correlation between the difference between the face image indicated by the face image data acquired by the data acquisition unit 110 and the face image captured by the photographing unit 120, and the guidance for the person to be photographed with respect to the difference, in advance.

In addition, the difference detection unit 181 detects the difference between the face image indicated by the face image data acquired by the data acquisition unit 110, and the face image captured by the photographing unit 120. In addition, the guidance acquisition unit 182 acquires guidance that is correlated with the difference detected by the difference detection unit 181 in correlation information. In addition, the output control unit 184 controls the output unit 130 in order for the output unit 130 to output the guidance acquired by the guidance acquisition unit 182.

According to this, in a case where the face authentication device 100 cannot appropriately perform the face authentication, it is possible to increase the probability that the authentication target can understand the handling method.

Hereinafter, the above-described various examples will be collectively described.

The data acquisition unit 110 acquires the face image data from the passport.

According to this, it is not necessary to prepare the face image data exclusively for the processing in the face authentication device 100, and thus a burden on a manager of the face authentication device 100 is reduced in the above-described viewpoint.

In addition, it is not necessary for the storage unit 170 to store the face image data in advance. Due to this viewpoint, storage capacity of the storage unit 170 decreases, and thus the manufacturing cost of the face authentication device 100 is reduced.

In addition, the data acquisition unit 110 acquires attribute data indicating an attribute of the person to be photographed from the passport. In addition, the guidance acquisition unit 182 acquires guidance corresponding to the attribute indicated by the attribute data acquired by the data acquisition unit 110.

According to this, the face authentication device 100 can output appropriate guidance in correspondence with the attribute of the person to be photographed.

For example, the data acquisition unit 110 acquires the attribute data indicating the nationality of the person to be photographed from the passport. In addition, the guidance acquisition unit 182 acquires guidance of a language corresponding to the nationality indicated by the attribute data.

According to this, the face authentication device 100 can output guidance in a language that can be understood by the person to be photographed.

In addition, in a case where the face image indicated by the face image data acquired by the data acquisition unit 110 is an eyeglass-wearing image, the output control unit 184 controls the output unit 130 in order for the output unit 130 to output an eyeglass-wearing instruction that recommends the person to be photographed to wear eyeglasses.

When the person to be photographed wears eyeglasses in response to the eyeglass-wearing instruction, a difference between the face image indicated by the face image data acquired by the data acquisition unit 110 and the face image captured by the photographing unit 120 is reduced, and thus it is possible to reduce the probability of an error occurring in the authentication that is performed by the face authentication unit 183.

Furthermore, before the face authentication unit 183 performs the face authentication, the output control unit 184 may allow the output unit 130 to output the eyeglass-wearing instruction that recommends the person to be photographed to wear eyeglasses.

Alternatively, in a case where the face authentication unit 183 performs the face authentication, and an error occurs in the face authentication, the output control unit 184 may allow the output unit 130 to output the eyeglass-wearing instruction that recommends the person to be photographed to wear eyeglasses. The eyeglass-wearing instruction in this case corresponds to an example of guidance.

In addition, the output control unit 184 allows the output unit 130 to display the face image indicated by the face image data acquired by the data acquisition unit 110. In addition, the output control unit 184 may control the output unit 130 in order for the output unit 130 to output a condition adjusting instruction that recommends the person to be photographed to adjust conditions, under which the photographing unit 120 captures the face image, to conditions shown in the face image displayed by the display unit 131.

Since the person to be photographed performs handling of adjusting the conditions, under which the photographing unit 120 captures the face image, to conditions shown in the face image displayed by the display unit 131 according to the condition adjusting instruction, it is possible to reduce the probability of an error occurring in the face authentication performed by the face authentication unit 183.

In addition, the output control unit 184 controls the output unit 130 in order for the output unit 130 to output difference information indicating the difference that is detected by the difference detection unit 181.

According to this, the person to be photographed can understand a difference between the face image indicated by the face image data acquired by the data acquisition unit 110, and the face image captured by the photographing unit 120 with reference to the difference information. When the person to be photographed understands the difference, it is possible to increase the probability capable of understanding a handling method for the difference (for example, a handling method of reducing the difference).

In addition, the output control unit 184 may allow the display unit 131 to display a portion different between the face image indicated by the face image data acquired by the data acquisition unit 110 and the face image captured by the photographing unit 120 as difference information that is shown in any one or both of the face image indicated by the face image data acquired by the data acquisition unit 110 and the face image captured by the photographing unit 120. For example, in a case where the face image (face image indicated by the face image data acquired by the data acquisition unit 110) of the passport does not wear eyeglasses, and the face image captured by the photographing unit 120 wears eyeglasses, the display unit 131 may display the eyeglass on the face image of the passport with a broken line, or may perform emphasizing display such things as the eyeglasses in the face image captured by the photographing unit 120 are surrounded with a broken line.

According to this, the person to be photographed can more reliably understand a difference between the face image of the passport and the face image captured by the photographing unit 120. Since the person to be photographed understands the difference, it is possible to increase the probability that the person to be photographed can understand a handling method for the difference (for example, a handling method of reducing the difference).

In addition, in a case where an error occurs in the face authentication that is performed by the face authentication unit 183, the difference detection unit 181 can estimate (detect) a difference that becomes the cause of the face authentication error, the difference being a difference between the face image indicated by the face image data acquired by the data acquisition unit 110 and the face image captured by the photographing unit 120.

Since the output control unit 184 controls the output unit 130 in order for the output unit 130 to output a handling method corresponding to the difference, the person to be photographed can understand a handling method corresponding to the cause of the face authentication error (for example, a handling method of reducing the difference that becomes the cause of the error in the face authentication).

In addition, the output control unit 184 allows the display unit 131 to display an image including the face image indicated by the face image data acquired by the data acquisition unit 110, the latest face image captured by the photographing unit 120, and display of the guidance acquired by the guidance acquisition unit 182.

Since the display unit 131 displays the guidance, the person to be photographed can understand a handling method for the difference between the face image indicated by the face image data acquired by the data acquisition unit 110 and the face image captured by the photographing unit 120. In addition, when the display unit 131 displays the face image indicated by the face image data acquired by the data acquisition unit 110, and the latest face image captured by the photographing unit 120, the person to be photographed can also understand the difference between the face image indicated by the face image data acquired by the data acquisition unit 110 and the face image captured by the photographing unit 120, and thus it is possible to increase the probability that the person to be photographed can understand a handling method for the difference.

In addition, the output control unit 184 allows the display unit 131 to display an image including a face image which is captured by the photographing unit 120 and is used in the face authentication by the face authentication unit 183, and in which an error occurs in the face authentication, the latest face image that is captured by the photographing unit 120, and display of the guidance that is acquired by the guidance acquisition unit 182.

According to this, the person to be photographed can confirm whether or not the cause of an error in the face image, which is captured by the photographing unit 120 and is used in the face authentication by the face authentication unit 183 and in which an error occurs in the face authentication, is eliminated in the latest face image that is captured by the photographing unit 120.

In addition, the output control unit 184 may allow the output unit to display an image including the face image indicated by the face image data acquired by the data acquisition unit 110, the face image which is captured by the photographing unit 120 and is used in the face authentication by the face authentication unit 183, and in which an error occurs in the face authentication, the latest face image captured by the photographing unit 120, and display of the guidance acquired by the guidance acquisition unit 182.

Since the display unit 131 displays the face image indicated by the face image data acquired by the data acquisition unit 110, and the face image which is captured by the photographing unit 120 and is used in the face authentication by the face authentication unit 183, and in which an error occurs in the face authentication, the person to be photographed can confirm a difference between the two face images. Since the person to be photographed confirms the difference, it is expected that the person to be photographed can accurately understand the guidance that is displayed on the display unit 131.

In addition, the output control unit 184 allows the display unit 131 to display the guidance acquired by the guidance acquisition unit 182 with text information.

According to this, the person to be photographed can understand the guidance through reading-out of display of the guidance with the text information.

In addition, the output control unit 184 allows the display unit 131 to display the guidance for the person to be photographed with an icon.

As described above, the display unit 131 displays the guidance through display of an icon such as an arrow, various persons to be photographed who use different languages can understand the guidance.

In addition, the correlation information storage unit 171 stores correlation information in which a difference in a face position between the face image indicated by the face image data acquired by the data acquisition unit 110 and the face image captured by the photographing unit 120, and guidance representing a direction in which the person to be photographed moves the face to reduce the difference in the face position are correlated with each other. In addition, in a case where the difference detection unit 181 detects the difference in the face position between the face image indicated by the face image data acquired by the data acquisition unit 110, and the face image captured by the photographing unit, the output control unit 184 allows the display unit 131 to display guidance that shows the direction with an arrow.

According to this, various persons to be photographed who use different languages can understand the movement direction.

In addition, the output control unit 184 allows the voice output unit 132 to output the guidance at least with a voice.

According to this, even in a case where the person to be photographed is not looking at the display screen of the display unit 131, or cannot see the display screen of the display unit 131 due to visual impairment and the like, the person to be photographed can understand the guidance.

In addition, the output control unit 184 allows the output unit 130 to output an alarm indicating that the output unit 130 outputs the guidance.

According to this, it is possible to reduce the probability that the person to be photographed erroneously understand the guidance.

Next, a minimum configuration of the invention will be described with reference to FIG. 8.

Figure 8:
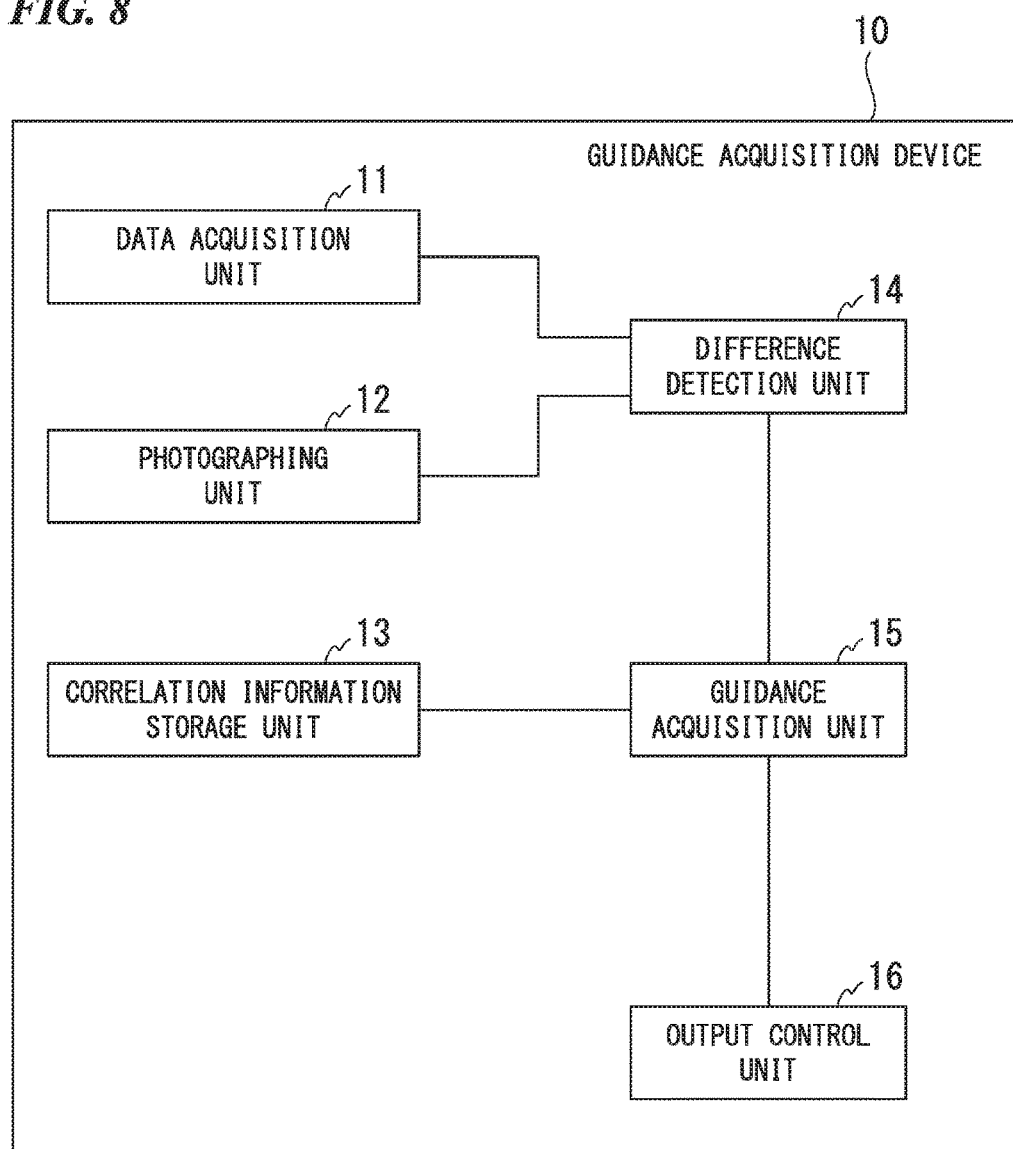
FIG. 8 is a schematic block diagram showing a minimum configuration of a guidance acquisition device according to the invention.

FIG. 8 is a schematic block diagram showing a minimum configuration of the guidance acquisition device according to the invention. A guidance acquisition device 10 shown in the drawing includes a data acquisition unit 11, a photographing unit 12, a correlation information storage unit 13, a difference detection unit 14, a guidance acquisition unit 15, and an output control unit 16.

In the configuration, the data acquisition unit 11 acquires face image data. In addition, the photographing unit 12 captures a face image. In addition, the correlation information storage unit 13 stores correlation information that indicates a correlation between a difference between the face image indicated by the face image data acquired by the data acquisition unit 11 and the face image captured by the photographing unit 12, and guidance for the person to be photographed with respect to the difference, in advance. In addition, the difference detection unit 14 detects a difference between the face image indicated by the face image data acquired by the data acquisition unit 11 and the face image captured by the photographing unit 12. In addition, the guidance acquisition unit 15 acquires the guidance that is correlated with the difference detected by the difference detection unit 14 in the correlation information. In addition, the output control unit 16 controls the output unit to output the guidance acquired by the guidance acquisition unit 15.

According to this, in a case where a device, which performs the face authentication by using the face image indicated by the face image data acquired by the data acquisition unit 11 and the face image captured by the photographing unit 12, cannot appropriately perform the face authentication, it is possible to increase the probability that the authentication target can understand a handling method.

Furthermore, all functions or partial functions of the control unit 180, the difference detection unit 14, the guidance acquisition unit 15, and the output control unit 16 in the above-described embodiment can be realized when the CPU reads out and executes a program.

In this case, the program for realizing the functions may be recorded in a computer-readable recording medium, and the program recorded in the recording medium may be read out and executed by a computer system to realize the functions.

Furthermore, it is assumed that the "computer system" stated here includes an OS and hardware such as peripherals.

In addition, the "computer-readable recording medium" represents a storage device such as a portable medium including a flexible disk, a magneto-optical disc, a ROM, a CD-ROM, and the like, and a hard disk drive that is embedded in the computer system.

In addition, the "computer-readable recording medium" may also include a configuration in which a program is dynamically retained for a short time as in a communication line in a case where the program is transmitted through a network such as the Internet and a communication channel such as a telephone line, and a configuration in which the program is retained for a constant time as in a volatile memory in the computer system which becomes a server or a client in this case.

In addition, the program may be configured to realize parts of the above-described functions, may be configured to realize the above-described functions in a combination with a program that is recorded in the computer system in advance, or may be realized by using a programmable logic device such as a field programmable gate array (FPGA).

Hereinbefore, the embodiment of the invention has been described in detail with reference to the accompanying drawings. However, a specific configuration is not limited to the embodiment, and includes a design and the like in a range not departing from the gist of the invention.

The entirety or parts of the above-described embodiment can be described as in the following additional statements, but there is no limitation thereto.

(Additional Statement 1)

A guidance acquisition device, including:
 a data acquisition unit that is configured to acquire face image data;
 a photographing unit that is configured to capture a face image;
 a difference detection unit that is configured to detect a difference between a face image indicated by the face image data acquired by the data acquisition unit and the face image captured by the photographing unit or a candidate of the difference on the basis of at least one of the face image indicated by the face image data acquired by the data acquisition unit and the face image captured by the photographing unit;
 a guidance acquisition unit that is configured to acquire guidance on the basis of the difference or the candidate of the difference which is detected by the difference detection unit; and
 an output control unit that is configured to control an output unit to output the guidance that is acquired by the guidance acquisition unit.

(Additional Statement 2)

The guidance acquisition device according to Additional Statement 1, further including:
 a correlation information storage unit that is configured to store correlation information that indicates a correlation between the difference between the face image indicated by the face image data acquired by the data acquisition unit and the face image captured by the photographing unit, and guidance for a person to be photographed with respect to the difference, in advance,
 wherein the difference detection unit is configured to detect the difference between the face image indicated by the face image data acquired by the data acquisition unit, and the face image captured by the photographing unit, and
 the guidance acquisition unit is configured to acquire guidance that is correlated with the difference detected by the difference detection unit in the correlation information.

(Additional Statement 3)

The guidance acquisition device according to Additional Statement 1 or 2,
 wherein the data acquisition unit is configured to acquire the face image data from a passport.

(Additional Statement 4)

The guidance acquisition device according to Additional Statement 3,
 wherein the data acquisition unit is configured to acquire attribute data indicating an attribute of a person to be photographed from the passport, and
 the guidance acquisition unit is configured to acquire guidance corresponding to the attribute indicated by the attribute data acquired by the data acquisition unit.

(Additional Statement 5)

The guidance acquisition device according to Additional Statement 4,
 wherein the data acquisition unit is configured to acquire the attribute data indicating the nationality of the person to be photographed, and
 the guidance acquisition unit is configured to acquire guidance in a language corresponding to the nationality.

(Additional Statement 6)

The guidance acquisition device according to any one of Additional Statements 1 to 5,
 wherein in a case where the face image indicated by the face image data acquired by the data acquisition unit is an eyeglass-wearing image, the output control unit is configured to control the output unit to output an eyeglass-wearing instruction that recommends a person to be photographed to wear eyeglasses.

(Additional Statement 7)

The guidance acquisition device according to any one of Additional Statements 1 to 6,
  wherein the output control unit is configured to control the output unit in order for the output unit to display the face image indicated by the face image data acquired by the data acquisition unit, and control the output unit to output a condition adjusting instruction that recommends a person to be photographed to adjust conditions, under which the photographing unit is configured to capture the face image, to conditions shown in the face image that is displayed by the output unit.

(Additional Statement 8)

The guidance acquisition device according to any one of Additional Statements 1 to 7,
  wherein the output control unit is configured to control the output unit to output difference information indicating the difference detected by the difference detection unit.

(Additional Statement 9)

The guidance acquisition device according to Additional Statement 8,
  wherein the output control unit is configured to control the output unit to display a portion different between the face image indicated by the face image data acquired by the data acquisition unit and the face image captured by the photographing unit as difference information that is shown in at least any one of the face image indicated by the face image data acquired by the data acquisition unit and the face image captured by the photographing unit.

(Additional Statement 10)

The guidance acquisition device according to any one of Additional Statements 1 to 9, further including:
  a face authentication unit that is configured to perform face authentication using the face image indicated by the face image data acquired by the data acquisition unit, and the face image captured by the photographing unit,
  wherein in a case where an error occurs in the face authentication that is performed by the face authentication unit, the difference detection unit is configured to detect a difference that becomes the cause of the face authentication error, the difference being the difference between the face image indicated by the face image data acquired by the data acquisition unit and the face image captured by the photographing unit.

(Additional Statement 11)

The guidance acquisition device according to any one of Additional Statements 1 to 10,
  wherein the photographing unit is configured to perform capturing of the face image repetitively, and
  the output control unit is configured to control the output unit to display an image including the face image indicated by the face image data acquired by the data acquisition unit, the latest face image captured by the photographing unit, and display of the guidance acquired by the guidance acquisition unit.

(Additional Statement 12)

The guidance acquisition device according to Additional Statement 10,
  the photographing unit is configured to perform capturing of the face image repetitively, and
  the output control unit is configured to control the output unit to display an image including a face image which is captured by the photographing unit and is used in the face authentication by the face authentication unit, and in which an error occurs in the face authentication, the latest face image that is captured by the photographing unit, and display of the guidance that is acquired by the guidance acquisition unit.

(Additional Statement 13)

The guidance acquisition device according to Additional Statement 10,
  wherein the photographing unit is configured to perform capturing of the face image repetitively, and
  the output control unit is configured to control the output unit to display an image including the face image indicated by the face image data acquired by the data acquisition unit, a face image which is captured by the photographing unit and is used in the face authentication by the face authentication unit, and in which an error occurs in the face authentication, the latest face image that is captured by the photographing unit, and display of the guidance that is acquired by the guidance acquisition unit.

(Additional Statement 14)

The guidance acquisition device according to any one of Additional Statements 1 to 13,
  wherein the output control unit is configured to control the output unit to display the guidance acquired by the guidance acquisition unit with text information.

(Additional Statement 15)

The guidance acquisition device according to any one of Additional Statements 11 to 14,
  wherein the output control unit is configured to control the output unit to display the guidance for a person to be photographed with an icon.

(Additional Statement 16)

The guidance acquisition device according to Additional Statement 15,
  wherein the correlation information storage unit is configured to store correlation information in which a difference in a face position between the face image indicated by the face image data acquired by the data acquisition unit and the face image captured by the photographing unit, and guidance representing a direction in which the person to be photographed moves the face to reduce the difference in the face position are correlated with each other, and
  in a case where the difference detection unit detects the difference in the face position between the face image indicated by the face image data acquired by the data acquisition unit and the face image captured by the photographing unit, the output control unit controls the output unit to display the guidance that shows the direction with an arrow.

(Additional Statement 17)

The guidance acquisition device according to any one of Additional Statements 1 to 16,
  wherein the output control unit is configured to control the output unit to output the guidance at least with a voice.

(Additional Statement 18)

The guidance acquisition device according to any one of Additional Statements 1 to 17,
  wherein the output control unit is configured to control the output unit to output an alarm indicating that the output unit outputs the guidance (Additional Statement 19)

A guidance acquisition method that is executed by a guidance acquisition device including a correlation information storage unit that is configured to store correlation information that indicates a correlation between a difference between a face image indicated by face image data and a face image obtained through photographing, and guidance for a person to be photographed with respect to the difference, in advance, the method including:
- a data acquisition step of acquiring the face image data;
- a photographing step of capturing the face image;
- a difference detection step of detecting the difference between the face image indicated by the face image data acquired in the data acquisition step, and the face image captured in the photographing step;
- a guidance acquisition step of acquiring guidance that represents guidance correlated with the difference detected in the difference detection step in the correlation information; and
- an output control step of controlling an output unit to output the guidance acquired in the guidance acquisition step.

(Additional Statement 20)

A program that causes a computer including a photographing unit, and a correlation information storage unit that is configured to store correlation information that indicates a correlation between a difference between a face image indicated by face image data and a face image obtained through photographing, and guidance for a person to be photographed with respect to the difference in advance to execute:
- a data acquisition step of acquiring the face image data;
- a photographing step of capturing the face image by the photographing unit;
- a difference detection step of detecting the difference between the face image indicated by the face image data acquired in the data acquisition step, and the face image captured in the photographing step;
- a guidance acquisition step of acquiring guidance correlated with the difference detected in the difference detection step in the correlation information; and
- an output control step of controlling an output unit to output the guidance acquired in the guidance acquisition step.

This application claims priority based on Japanese Patent Application No. 2015-177813, filed Sep. 9, 2015, the content of which is incorporated herein by reference.

INDUSTRIAL APPLICABILITY

According to the invention, in a case where a device that is configured to perform face authentication cannot appropriately perform the face authentication, it is possible to increase the probability that an authentication target can understand a handling method.

REFERENCE SIGNS LIST

10 Guidance acquisition device
11, 110 Data acquisition unit
12, 120 Photographing unit
13, 171 Correlation information storage unit
14, 181 Difference detection unit
15, 182 Guidance acquisition unit
16, 184 Output control unit
100 Face authentication device
130 Output unit
131 Display unit
132 Voice output unit
170 Storage unit
180 Control unit
183 Face authentication unit

The invention claimed is:

1. A face authentication device, comprising:
a photographing unit configured to capture a first face image;
a memory storing instructions; and
a processor configured to execute the instructions to implement:
a data acquisition unit configured to acquire a second face image;
a difference detection unit configured to detect a difference between the first face image and the second face image;
a face authentication unit configured to perform face authentication using the first face image and the second face image; and
an output unit configured to output a guidance corresponding to a difference between the first face image and the second face image in a case in which an error occurs in the face authentication, and not to output the guidance in a case in which it is determined that the first face image and the second face image indicate a same person.

2. The face authentication device according to claim 1, wherein the output unit is configured to output the guidance on how to respond to the difference.

3. The face authentication device according to claim 1, wherein the face authentication unit is configured to determine that it is the same person when the first face image and the second face image are the same.

4. The face authentication device according to claim 1, wherein the face authentication unit is configured to determine that the face authentication is an error when the face authentication unit cannot determine whether or not the first face image and the second face image are the same.

5. The face authentication device according to claim 1, further comprising:
a display unit configured to display the guidance to a person to be photographed regarding the difference between the first face image and the second face image when the face authentication is an error.

6. The face authentication device according to claim 1, further comprising:
a display unit configured to display that the face is being photographed when the face authentication unit is performing face authentication.

7. The face authentication device according to claim 1, further comprising:
a display unit configured to display a message prompting staff to be informed when it is determined that the first face image and the second face image are different persons.

8. The face authentication device according to claim 1, further comprising:
a display unit configured to display a message indicating that entry is possible when it is determined that the first face image and the second face image are the same.

9. The face authentication device according to claim 1, wherein a door of a gate is opened when it is determined that the first face image and the second face image are the same.

10. The face authentication device according to claim 1, wherein the output unit is configured to output different guidance for each of the differences when the face authentication is an error.

11. The face authentication device according to claim 1, wherein the data acquisition unit is configured to acquire the first face image from a passport.

12. The face authentication device according to claim 11,
wherein the data acquisition unit is configured to acquire attribute data indicating an attribute of a person to be photographed from the passport, and
wherein a guidance acquisition unit is configured to acquire the guidance corresponding to the attribute.

13. The face authentication device according to claim 12,
wherein the data acquisition unit is configured to acquire the attribute data indicating a nationality of the person to be photographed, and
wherein the guidance acquisition unit is configured to acquire the guidance in a language corresponding to the nationality.

14. The face authentication device according to claim 1,
wherein in a case in which the second face image is an eyeglass-wearing image, the output unit is configured to output an eyeglass-wearing instruction that recommends a person to be photographed to wear eyeglasses.

15. The face authentication device according to claim 1,
wherein the output unit is configured to display the second face image, and output a condition adjusting instruction that recommends a person to be photographed to adjust conditions, under which the photographing unit is configured to capture the first face image, to conditions shown in the second face image that is displayed by the output unit.

16. A face authentication method, comprising:
capturing a first face image;
acquiring a second face image;
detecting a difference between the first face image and the second face image;
performing face authentication using the first face image and the second face image; and
outputting a guidance corresponding to a difference between the first face image and the second face image in a case in which an error occurs in the face authentication, and not to output the guidance in a case in which it is determined that the first face image and the second face image indicate a same person.

17. A non-transitory computer-readable recording medium storing a program to perform processes comprising:
capturing a first face image;
acquiring a second face image;
detecting a difference between the first face image and the second face image;
performing face authentication using the first face image and the second face image; and
outputting a guidance corresponding to a difference between the first face image and the second face image in a case in which an error occurs in the face authentication, and not to output the guidance in a case in which it is determined that the first face image and the second face image indicate a same person.

* * * * *